United States Patent
Young et al.

(10) Patent No.: US 9,234,471 B2
(45) Date of Patent: Jan. 12, 2016

(54) DRIVER ALERT AND DE-RATE CONTROL SYSTEM AND METHOD

(71) Applicant: GENERAL ELECTRIC COMPANY, Schenectady, NY (US)

(72) Inventors: Henry Todd Young, Erie, PA (US); Kenneth Paul Nedley, Lawrence Park, PA (US); Sean Cillessen, Lawrence Park, PA (US); Timothy Warren Brown, Erie, PA (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 14/094,333

(22) Filed: Dec. 2, 2013

(65) Prior Publication Data

US 2014/0156175 A1 Jun. 5, 2014

Related U.S. Application Data

(60) Provisional application No. 61/732,312, filed on Dec. 1, 2012.

(51) Int. Cl.
| | |
|---|---|
| *F02D 45/00* | (2006.01) |
| *F02D 29/02* | (2006.01) |
| *B60W 30/182* | (2012.01) |
| *F02D 41/14* | (2006.01) |
| *F02D 41/26* | (2006.01) |

(52) U.S. Cl.
CPC ............. *F02D 29/02* (2013.01); *B60W 30/182* (2013.01); *F02D 41/1461* (2013.01); *F02D 41/26* (2013.01); *F02D 2200/1002* (2013.01); *F02D 2200/1012* (2013.01); *F02D 2200/501* (2013.01); *F02D 2200/701* (2013.01); *F02D 2250/18* (2013.01); *F02D 2250/26* (2013.01)

(58) Field of Classification Search
CPC .............. F02D 41/146; F02D 41/1462; F02D 2200/0806; F02D 2200/0808; F02D 2200/0811; F02D 2200/701; F02D 2200/501; F02D 2250/18; F02D 2200/1002
USPC ............. 123/672, 703; 60/276; 701/103, 109, 701/110; 73/114.71, 114.72
See application file for complete search history.

(56) References Cited

U.S. PATENT DOCUMENTS

| | | | |
|---|---|---|---|
| 7,813,869 B2 | 10/2010 | Grichnik et al. | |
| 8,103,425 B2 * | 1/2012 | Choi | ...................... F02D 35/023 123/435 |
| 8,145,398 B2 * | 3/2012 | Landes | ............... F16H 61/0213 701/51 |

* cited by examiner

*Primary Examiner* — Hai Huynh
(74) *Attorney, Agent, or Firm* — GE Global Patent Operation; John A. Kramer

(57) ABSTRACT

A driver alert and de-rate control system for a vehicle includes a sensor configured to monitor an engine operating condition, and a control unit in communication with the sensor. The control unit is configured to estimate a time until automatic de-rate of the engine based on the engine operating condition and to modify a performance parameter of the vehicle in dependence upon the estimated time until automatic de-rate.

20 Claims, 3 Drawing Sheets

US 9,234,471 B2

DRIVER ALERT AND DE-RATE CONTROL SYSTEM AND METHOD

CROSS REFERENCE TO RELATED APPLICATIONS

This application claims the benefit of U.S. Provisional Application Ser. No. 61/732,312, filed on Dec. 1, 2012, which is incorporated by reference in its entirety.

FIELD OF THE INVENTION

Embodiments of the invention relate to control systems for reducing emissions of internal combustion engines. Other embodiments relate to control systems for reducing the emissions of non-road diesel engines.

BACKGROUND OF THE INVENTION

Emissions standards are requirements that set specific limits on the amount of pollutants that can be released into the environment. The first U.S. federal standards for new non-road diesel engines were adopted in 1994, and the most recent "Tier 4" standards, to be phased in by 2015, are even more stringent. In particular, Tier 4 standards for non-road diesel engines, such as those used on mine haul trucks and other equipment often used in the mining industry, require that emissions of particulate matter (PM) and nitrogen oxides ($NO_x$) be further reduced by 90% from current allowable levels.

In order to comply with these standards, new non-road diesel engines often include an exhaust gas aftertreatment system, e.g., selective catalytic reduction, to reduce $NO_x$ emissions. This particular type of exhaust gas aftertreatment involves the injection of diesel exhaust fluid (DEF) into the exhaust as it moves though the engine, where it vaporizes and decomposes to form ammonia and carbon dioxide. The $NO_x$ are catalytically reduced by the ammonia into water and nitrogen, which are both harmless, and are released through the exhaust. In conjunction with the exhaust gas aftertreatment system, new non-road diesel engines typically include control technologies that limit the power output of the engine if emissions exceed set guidelines. In particular, the engines may include a controller having a built in warning and override system that is configured to automatically de-rate the engine (performance de-rates) to prevent operation without proper emission control. For example, the controller may be configured to automatically de-rate the engine when sensed emission levels exceed allowable limits, such as when a supply of DEF is exhausted, leading to a spike in $NO_x$ emission.

Existing emission control systems for non-road diesel engines, however, have the potential to create significant vehicle deration at undesirable times, such as when a loaded haul truck is operating on grade in a surface mine. As will be readily appreciated, automatically de-rating on grade, especially without adequate warning to a driver of the haul vehicle, may compromise safety and may also slow mine production. As such, it is desirable to provide a driver alert/warning and de-rate control system that improves operational safety and limits production impact.

BRIEF DESCRIPTION OF THE INVENTION

An embodiment of the invention relates to a system for a vehicle, e.g., a driver alert and de-rate control system. The system includes a sensor configured to monitor an engine operating condition of an engine of the vehicle, and a control unit configured to communicate with the sensor. The control unit is configured to determine an estimated time until automatic de-rate of the engine based on the engine operating condition and to modify a performance parameter of the vehicle in dependence upon the estimated time until automatic de-rate.

In another embodiment, a method for controlling an engine (e.g., controlling de-ration) of a vehicle is provided. The method includes the steps of estimating at least one automatic de-rate characteristic, issuing a pre-emptive warning to an operator of the vehicle of the at least one automatic de-rate characteristic, and modifying an operating condition of the vehicle to avoid automatic de-rate.

In another embodiment, an engine control system for an off-highway vehicle or other vehicle is provided. The system includes a sensor configured to monitor an engine operating condition of an engine of the vehicle, and a control unit configured to communicate with the sensor. The control unit is configured to estimate a time until automatic de-rate of the engine and a location in a haul cycle where the de-rate will occur based on the engine operating condition, and to modify a performance parameter of the vehicle in dependence upon the estimated time until, and location of, automatic de-rate.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
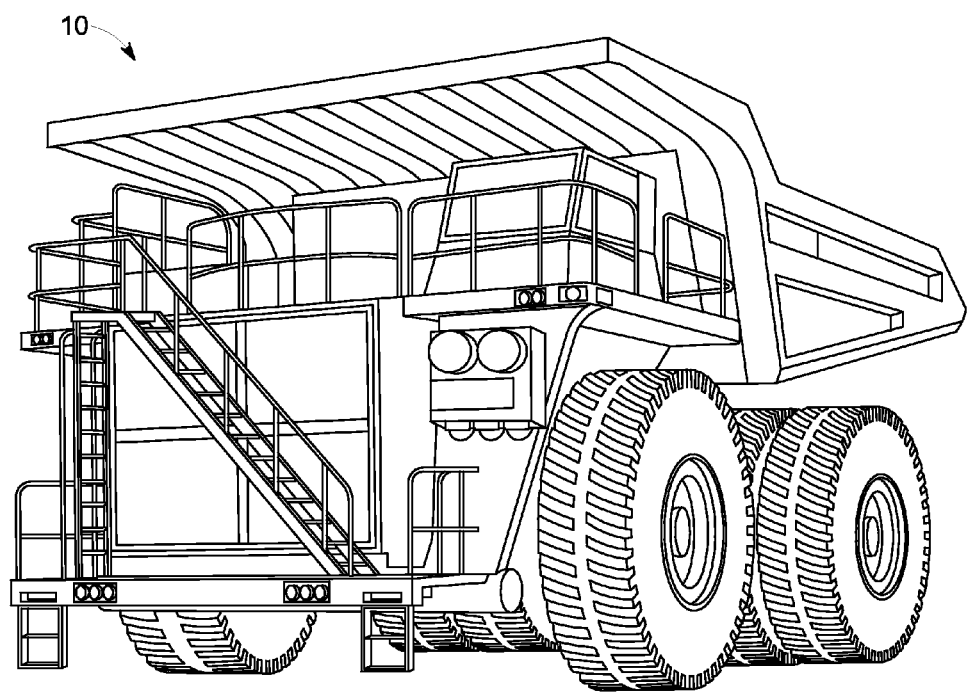
FIG. 1 is a perspective view of a haul truck having a diesel engine, in which the driver alert and de-rate control system of the present invention may be incorporated.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to haul trucks having a diesel engine that are utilized in the surface mining industry, embodiments of the invention are also applicable for use with internal combustion engines and vehicles employing such engines, generally. For example, the vehicles may be off-highway vehicles ("OHVs") designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, etc. As used herein, "de-rate" means lowering the power output of the engine of the vehicle, which is utilized to decrease emissions concentration. As used herein, "electrical communication" or "electrically coupled" means that certain components are configured to communicate with one another through direct or indirect signaling by way of direct or indirect electrical connections.

Figure 2:
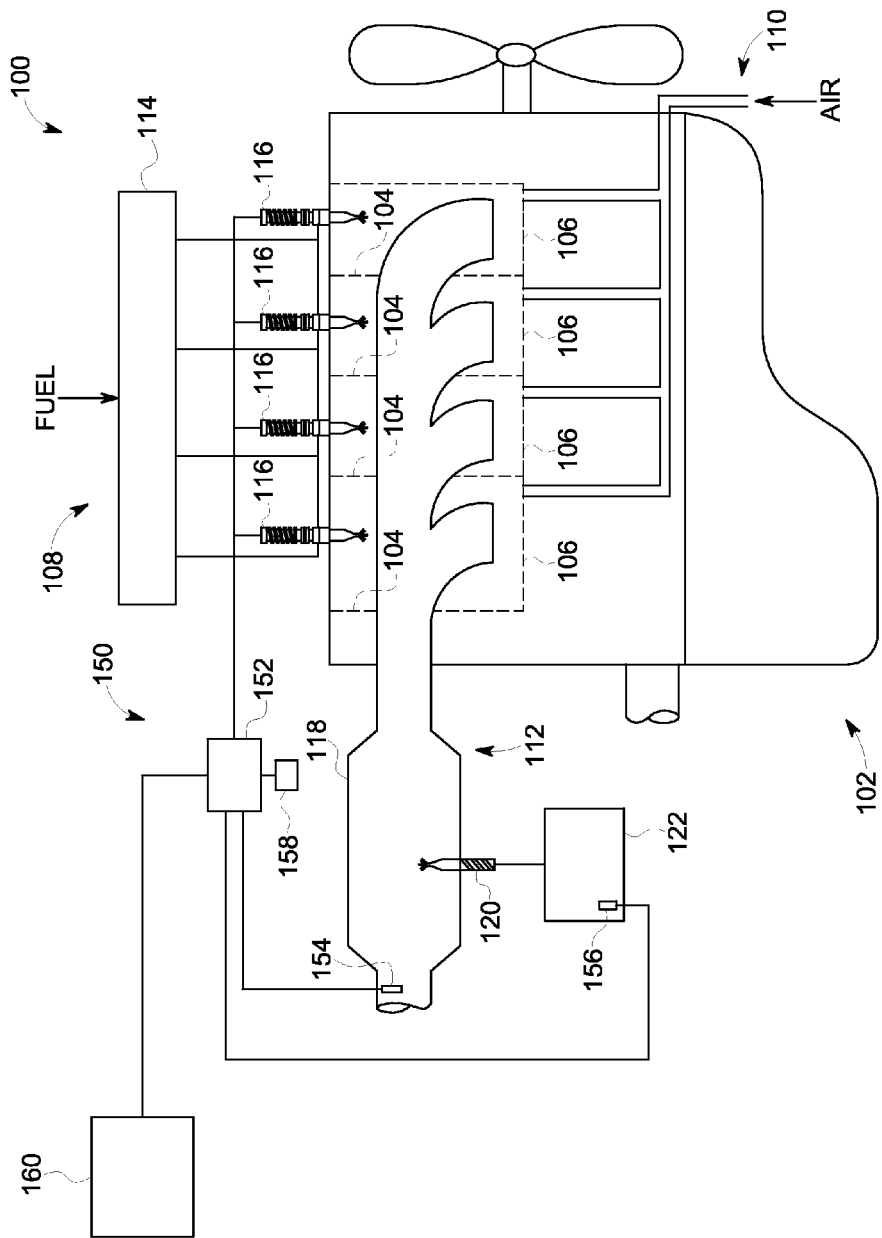
FIG. 2 is a schematic illustration of a driver alert and de-rate control system according to an embodiment of the present invention.

FIG. 1 illustrates a haul truck 10, in which the driver alert and de-rate control system of the present invention may be incorporated. The haul truck 10 is a dump truck specifically engineered for use in high production mining and heavy-duty construction environments, and includes a power system 100 which provides motive power to the haul truck 10. (The haul truck 10 is illustrative of vehicles generally, although in embodiments, a system and/or method of the invention is implemented on a haul truck specifically.) With reference to FIG. 2, the power system 100 includes an engine 102 and a control system 150. The engine 102 may be a diesel engine, however, other types of internal combustion engines such as, for example, a gasoline engine or a gaseous fuel-powered engine (e.g., engine that runs on diesel and/or natural gas) are equally applicable.

As best shown in FIG. 2, the engine 102 includes a plurality of cylinder heads 104 that at least partially define a plurality of combustion chambers 106. The engine 102 further includes a fuel system 108, an air intake system 110 and an exhaust system 112. Fuel system 108 is configured to direct pressurized fuel into combustion chambers 106 of the engine 102, and air intake system 110 is configured to direct air into the combustion chambers 106, where the air and fuel are combusted within the engine 102 to produce power and a flow of exhaust, as is known in the art. Exhaust system 112 is configured to direct the flow of exhaust to atmosphere, as is also known in the art.

Fuel system 108 includes a manifold 114 through which fuel may be pumped via fuel lines to fuel injectors 116 disposed within the cylinder heads 104. The fuel injectors 110 are operable to inject a quantity of pressurized fuel into an associated combustion chamber at predetermined timings and fuel pressures, as controlled by the control system 150. In particular, by altering the injection timing and pressure of the injected fuel, the control system 150 may alter the performance of the engine 102, as discussed in detail below.

As further shown in FIG. 2, the air intake system 110 is configured to introduce pressurized air into the combustion chambers 106 to facilitate combustion. In an embodiment, the control system 150 may additionally, or alternatively, control the power output of the engine 102 by controlling air flow to the combustion chambers 106, as also discussed hereinafter.

The exhaust system 112 includes an exhaust manifold 118 in fluid communication with the combustion chambers 116. As is known in the art, the exhaust system is configured to direct exhaust from cylinders 104 to the atmosphere. In an embodiment, the control system 150 may control the power output of the engine 102 by increasing exhaust gas recirculation, and/or by changing the back-pressure of the engine 102. As also shown in FIG. 2, the exhaust system 112 may also include a DEF injector 112 that is configured to inject a quantity of diesel exhaust fluid ("DEF") from a DEF reservoir 122 into the flow of exhaust prior to the exhaust exiting the manifold 118 to atmosphere. As is known in the art, the DEF reacts with the exhaust within the manifold 118 to remove undesirable nitrous oxides from the exhaust and thereby lower $NO_x$ emissions.

The control system 150 may include a control unit 152 and a plurality of sensors for monitoring various engine operating conditions. In particular, an exhaust sensor 154 may be positioned adjacent to the exhaust manifold exit and is electrically coupled to the control unit 152. The sensor 154 is configured to monitor $NO_x$ emissions and provide the control unit 152 with a signal indicative of the concentration of $NO_x$ in the exhaust flow. In addition, a DEF sensor 156 may be positioned within the DEF reservoir 122 and is configured to monitor a level of DEF in the reservoir 122. The DEF sensor 156, likewise, is electrically coupled to the control unit 152 and provides the control unit 152 with a signal indicative of the amount of DEF remaining at the reservoir 122 at any given time. While embodiments of the present invention contemplate electrical coupling, components herein may be coupled in other manners so that data and signals may be transferred between components, such as through wireless communication.

In an embodiment, the control unit 152 may be a microprocessor or a plurality of microprocessors that include a means for controlling an operation of the fuel system 108, air intake system 110 and/or exhaust system 112, and can communicate with the fuel injectors 116, components of the air intake system 110 and exhaust system and various sensors, such as sensors 154 and 156.

In an embodiment, the control system 150 also includes a location tracking mechanism 158, such as a GPS unit, radio frequency transmitter, or other mechanism known in the art for sending a signal indicative of a precise position of the vehicle 10 to the control unit 152. As also shown in FIG. 2, a driver alert mechanism 160 is electrically coupled to the control unit 152. The driver alert mechanism 160, as discussed hereinafter, provides a warning or alert to an operator of the haul truck 10 or other vehicle of anticipated engine de-rate as a result of anticipated and/or actual exceeding of allowed emissions levels.

In order to comply with more stringent emissions standards (in particular, Tier 4 emissions standards), the control system 150 is configured to automatically de-rate the engine 112 when emissions levels exceed a pre-determined threshold, by means known in the art. For example, upon detection of emissions levels, e.g., emissions of $NO_x$, above an allowable limit, the control unit 152 may alter the injection timing and pressure of the injected fuel, limit the air flow to the combustion chambers 106, increase exhaust gas recirculation, and/or change the back-pressure of the engine 102 to limit the power output of the engine until emissions are brought back to allowable levels. As discussed above, however, automatic de-rating of the engine is particularly undesirable in certain situations, such as when the haul truck 10 or other vehicle is hauling a load on grade.

The control system of the present invention is therefore configured to predict when automatic engine de-rate may likely occur and to alert an operator of the haul truck or other vehicle so that corrective action may be taken by the operator or so an operator can seek a safe location before the emissions level triggers automatic de-rate. In particular, the control system 150 of the present invention, and the control unit 152 in particular, is configured to estimate the time until engine de-rate and where in the haul cycle de-rate will likely occur.

In an embodiment, the control system 150 is configured to estimate the time until engine de-rate based upon engine and/or DEF sensor feedback (i.e., based upon detected or estimated engine operating conditions). For example, the control unit 152 may receive signals indicative of operating conditions of the engine 102, and may anticipate impending engine de-rate based on such conditions. In addition, the control unit 152 may continuously monitor emission concentrations by way of sensor 154 such that a steady or sharp rise in detected emission concentrations may be utilized by the control unit 152 to predict future exhaust emission concentrations and when the engine 102 will be automatically de-rated. (For example, the vehicle may be configured for initiation of automatic de-ration when the emissions level exceeds a designated emissions level threshold value. The control system may be configured to extrapolate when the designated emissions level threshold value will be exceeded based on the current emissions level of the vehicle and a determined rate of change of the emissions level. The determined rate of change may be determined based on past measured values of the emissions level and a known (e.g., empirically determined) relationship (e.g., linear relationship) of how values change over time given a set of current operating conditions.) In another embodiment, the control unit 152 may monitor the level of DEF in the DEF reservoir 122 by way of DEF sensor 156. By monitoring the amount of DEF remaining, the control unit 152 can predict exactly when the DEF will be exhausted, and thus predict precisely when emissions of $NO_x$ will increase due to no more DEF (which would trigger engine de-rate).

In an embodiment, the control unit 152 may also estimate the time until engine de-rate based on drive system parameters, such as how much horsepower is being output by the engine 102 at a given time. As emissions necessarily increase when engine output (i.e., horsepower) increases, the control unit 152 can predict when emission levels will likely exceed an allowable threshold based upon the horsepower being output by the engine at any given time, average engine output over a given time period, or a horsepower trend.

In an embodiment, the control system 150 may utilize learning algorithms to learn haul profiles of the haul truck 10 or other vehicle. For example, the control system 150 may utilize a trend analysis wherein the control unit 152 monitors and stores in memory one or more engine operating parameters (or sensor readings) at certain predetermined intervals, and then predicts a future engine operating parameter or sensor reading based on the trend of the recorded parameter or sensor reading. In particular, the control unit may monitor the $NO_x$ emissions via sensor 154 at predetermined intervals. The control unit 154 may then analyze the recorded values of $NO_x$ emissions to predict likely $NO_x$ emissions in the future. In this manner, if the trend indicates that the concentration of harmful emissions is increasing and will exceed a regulatory threshold such that automatic de-rate will be initiated, the operator may be notified and/or corrective action may be taken, as discussed hereinafter.

In addition, feedback from the location tracking mechanism 158 may also be utilized by the control unit 152, in conjunction with learning algorithms, to predict spikes in emission concentrations. For example, as a haul truck 10 or other vehicle travels along a route, its emissions (or other engine operating parameters such as horsepower, etc.) at specific positions may be determined and recorded in memory. This recording of operating parameters and emissions concentrations at given locations may be referred to as "haul profile." The control unit 152 may then analyze this recorded data to determine exactly where in the haul cycle (e.g., the GPS determined position of the haul truck 10 or other vehicle) emissions concentrations increase and/or where de-rate will occur, so that corrective action may be taken to avoid automatic de-rate.

Estimating the time until de-rate and where in the haul cycle de-rate will occur is only one aspect of the present invention. The driver alert and de-rate control system of the present invention is also configured to issue a pre-emptive warning to an operator of the haul truck or other vehicle once the control system 150 anticipates an automatic de-rate action utilizing one or more of the methods discussed above. In an embodiment, the pre-emptive warning may be issued through the driver alert mechanism 160, which may be located in the operator's cab of the haul truck 10 or other vehicle and electrically connected to the control unit 152. The pre-emptive warning may take the form of one or more of lights, sounds, or control vibration. In aspects, pre-emptive refers to the warning occurring before the automatic de-rate action. Additionally, the pre-emptive warning may communicate to the operator the need for corrective action to stave off automatic de-rate.

After the pre-emptive warning has been issued, smart driver alert may be commenced. The smart driver alert may present a suggested truck/vehicle behavior modification (i.e., performance parameter modification), that will automatically be undertaken in the absence of override from the operator, to prevent automatic engine de-rate. The suggested truck/vehicle behavior/performance parameter modification may be indicated to the operator through the driver alert mechanism 160. In an embodiment, truck/vehicle behavior modification, also referred to herein as performance parameter modification, may include limiting the engine acceleration rate, limiting traction horsepower, and/or limiting vehicle speed, all of which result in a decrease in emission concentrations and can prevent automatic engine de-rate. This performance parameter modification may also include limiting engine acceleration rate, traction horsepower, and vehicle speed in dependence upon a position of the haul truck 10 or other vehicle in the haul route, as well as in dependence upon learned parameters such as speed in the last haul cycle, as discussed above. In addition, the control unit 152 may achieve this truck/vehicle performance parameter modification by altering the injection timing and pressure of the injected fuel, limiting the air flow to the combustion chambers 106, increasing exhaust gas recirculation, and/or changing the back-pressure of the engine 102, as discussed previously. This performance parameter modification may be considered "controlled de-rate," meaning that the de-rate is voluntarily undertaken in order to avoid uncontrollable and automatic deration.

In an embodiment, the control system 150 is configured to undertake the determined truck/vehicle behavior/performance parameter modification after a preset period of time, in the absence of override from the operator. When de-rate is commenced a de-rate warning may be issued through driver alert mechanism 160. An operator may, however, override the planned behavior modification to avoid de-rate on grade or at other inopportune times. As will be readily appreciated, the smart driver alert, automatic truck/vehicle behavior modification, and de-rate override provide for seamless operation during appropriate critical portions of a haul cycle (such as preventing de-rate while hauling a load on grade). In other embodiments, truck/vehicle behavior modification in response to estimated automatic engine de-rates may be initiated manually.

Figure 3:
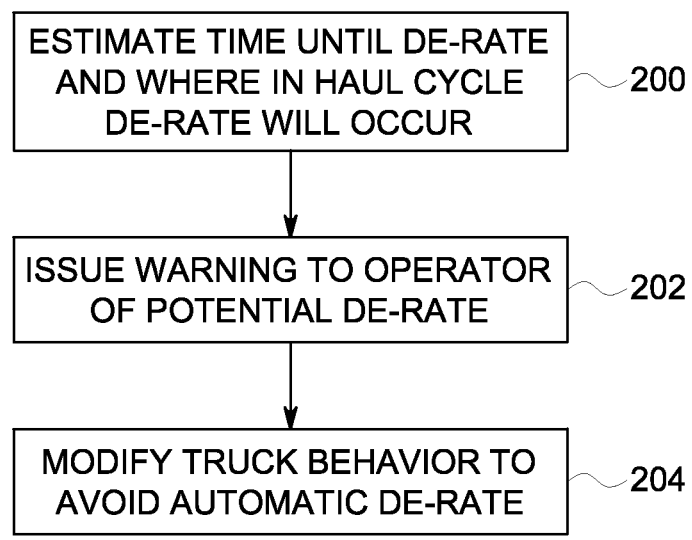
FIG. 3 is a flowchart illustrating a simplified method for controlling de-ration of an engine of a vehicle.

FIG. 3 illustrates the operation of the driver alert and de-rate control system of the present invention. As shown therein, at step 200, the system first estimates the time until de-rate and where in a haul cycle de-rate will likely occur. As discussed above, this may be accomplished through learning algorithms, through drive system parameters, and/or through the monitoring of various engine parameters and sensor feedback. Once time and location of de-rate has been determined with some certainty, the system will issue a warning to the operator, at step 202, through the driver alert mechanism 160, to warn the operator that de-rate will occur unless vehicle behavior is modified. As shown therein, at step 204, the system will then alert the driver of the type of behavior modification to be taken to prevent automatic de-rate, and will undertake such modification absent operator override.

In an embodiment where the haul truck 10 is a hybrid haul truck or other hybrid OHV or other hybrid vehicle, the control system 150 may utilize stored energy to provide optimal performance. For example, when de-rate is scheduled to occur on grade, stored energy may be utilize to provide extra power necessary to help the haul truck 10 or other vehicle get up a hill.

In other embodiments, the haul truck 10 or other vehicle may be a trolley equipped vehicle, that is, a vehicle equipped to receive electricity from an off-board line. (For example, the line may be deployed along portions of a route of the vehicle.) In such an embodiment, the drive and control system of the vehicle may be configured to manage de-rate to avoid transitioning from full trolley power to de-rated engine power when coming off line. Thus, in an embodiment, a system for a vehicle comprises a trolley system attached to the vehicle for receiving traction electricity for the vehicle from an off-board line positioned along a route of the vehicle, and a control unit on-board the vehicle. (Traction electricity refers to electricity for powering traction motors of the vehicle, to move the vehicle along the route.) The control unit is configured to control an engine of the vehicle to a first power level that is greater than a designated de-rate power level for the engine. This is done responsive to (i) the vehicle transitioning from receiving the fraction electricity to no longer receiving the fraction electricity and (ii) one or more engine operating conditions being indicative of the de-rate power level. That is, if the one or more engine operating conditions are indicative of the de-rate power level (i.e., if the one or more engine operating conditions would result in the vehicle being controlled to the de-rate power level under other circumstances), and when the vehicle is transitioning from receiving off-board electricity to running using the vehicle engine and without off-board electricity, the control unit controls the engine to the first power level instead of to the de-rate power level. This is done for at least a transition time period after the vehicle no longer receives the traction electricity. For example, the transition time period may be a designated time period of sufficient length to prevent a designated rate of decrease (sharp decrease) in power levels and/or to facilitate a driver alert and de-rate control method as set forth herein.

Another embodiment relates to a system for a mining haul truck or other vehicle. The system comprises a sensor configured to monitor an engine operating condition(s) of an engine of the vehicle, a control unit on board the vehicle and in communication with the sensor, and a location tracking mechanism on board the vehicle and in communication with the control unit, which is configured to determine a geographic location of the vehicle. The control unit is configured to determine if a de-rate of the engine is projected to occur within designated geographic boundaries (e.g., a portion of a route where the vehicle will travel on a non-zero degree grade), based on the geographic location of the vehicle that is determined and on the engine operating condition(s) that is monitored. If so, the control unit is configured to configured to modify a performance parameter of the vehicle ahead of the vehicle entering the designated geographic boundaries, to avoid the de-rate within the boundaries.

As will be readily appreciated, the smart driver alert and de-rate control system of the present invention is proactive in nature, in that it predicts when and where in a haul cycle emissions may exceed allowable threshold levels (and thus when the engine may be automatically de-rated to comply with stringent emissions standards) so that corrective action may be taken to avoid de-rate at undesirable times. This is in contrast to existing systems which are merely reactive in nature, which automatically and undesirably de-rate the engine only when emission concentrations actually exceed allowable limits, leading to possible unsafe deration on grade. By predicting when deration will occur, preemptive action may be taken to avoid de-rate on grade, thereby increasing safety and limiting production impact.

An embodiment of the present invention relates to a driver alert and de-rate control system for a vehicle. The system includes a sensor configured to monitor an engine operating condition and a control unit in communication with the sensor. The control unit is configured to estimate a time until automatic de-rate of the engine based on the engine operating condition and to modify a performance parameter of the vehicle in dependence upon the estimated time until automatic de-rate.

In an embodiment, the control unit is further configured to receive a signal indicative of the engine operating condition, compare the signal to an allowable range of engine operation conditions, and predicting a future engine performance based on the signal. In an embodiment, the performance parameter is one of engine acceleration rate, traction horsepower and vehicle speed.

In an embodiment, the sensor is a $NO_x$ sensor and the operating condition is a concentration of $NO_x$.

In an embodiment, the system further includes a driver alert mechanism. The driver alert mechanism may be configured to issue a pre-emptive warning indicating modification of the performance parameter. The pre-emptive warning may be one or more of lights, sounds and vibrations.

In another embodiment, the system may also include a location tracking mechanism in communication with the control unit. The location tracking mechanism may be configured to relay to the control unit a signal relating to a geographical location of the vehicle.

In an embodiment, the control unit is configured to estimate the time until automatic de-rate based on drive system parameters.

In an embodiment, the control unit is configured to modify the performance parameter based on a geographical location of the vehicle.

In another embodiment, a method for controlling deration of an engine of a vehicle is provided. The method includes the steps of estimating at least one automatic de-rate characteristic, issuing a pre-emptive warning to an operator of the vehicle of the at least one automatic de-rate characteristic, and modifying a performance parameter of the vehicle to avoid automatic de-rate.

In an embodiment, the at least one automatic de-rate characteristic is a time until automatic de-rate. In an embodiment, the at least one automatic de-rate characteristic is a location of the vehicle in a haul cycle at the time of automatic de-rate.

In an embodiment, the step of modifying a performance parameter of the vehicle includes at least one of limiting an engine acceleration rate, limiting traction horsepower and limiting a speed of the vehicle. In another embodiment, the step of modifying a performance parameter of the vehicle includes utilizing variable engine acceleration rate, fraction horsepower and speed limits based on a position of the vehicle in a haul route and at least one learned parameter. In an embodiment, the at least one learned parameter is a speed of the vehicle in a previous haul cycle.

In an embodiment, the method may further include the step of issuing a secondary warning to the operator indicating the modified performance parameter.

In an embodiment, the step of estimating at least one automatic de-rate characteristic includes receiving a signal indicative of a current engine operation, comparing the signal to an allowable range of engine operation, and predicting a future engine performance based on the signal.

In an embodiment the method may also include the step of receiving data relating to a geographical location of the vehicle. In an embodiment, the step of modifying a performance parameter of the vehicle to avoid automatic de-rate may be based on the data relating to the geographical location.

In an embodiment, the signal is indicative of a $NO_x$ emissions level.

In another embodiment, an engine control system for an off-highway vehicle is provided. The system includes an engine, an exhaust system associated with the engine, a fuel system associated with the engine, an air intake system associated with the engine, a sensor configured to monitor an engine operating condition, and a control unit in communication with the sensor. The control unit is configured to estimate a time until automatic de-rate of the engine and a location in a haul cycle where the de-rate will occur based on the engine operating condition and to modify a performance parameter of the vehicle in dependence upon the estimated time until, and location of, automatic de-rate.

In an embodiment, the sensor is a $NO_x$ sensor and the operating condition is a concentration of $NO_x$.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the driver alert and de-rate control system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for a vehicle, comprising:
a sensor configured to monitor an engine operating condition of an engine of the vehicle; and
a control unit configured to communicate with the sensor;
wherein the control unit is configured to determine an estimated time until automatic de-rate of the engine based on the engine operating condition; and
wherein the control unit is configured to modify a performance parameter of the vehicle in dependence upon the estimated time until automatic de-rate.

2. The system of claim 1, wherein:
the control unit is further configured to receive a signal indicative of the engine operating condition, compare the signal to an allowable range of engine operation conditions, and predict a future engine performance based on the comparison.

3. The system of claim 1, wherein:
the sensor is a $NO_x$ sensor and the engine operating condition is a concentration of $NO_x$.

4. The system of claim 1, further comprising:
a driver alert mechanism, the driver alert mechanism being configured to issue a pre-emptive warning indicating modification of the performance parameter.

5. The system of claim 4, wherein:
the pre-emptive warning is one or more of lights, sounds, or vibrations.

6. The system of claim 1, further comprising:
a location tracking mechanism configured to communicate with the control unit, the location tracking mechanism being configured to relay to the control unit a signal relating to a geographic location of the vehicle, wherein the control unit is configured to modify the performance parameter based on the geographic location of the vehicle.

7. The system of claim 1, wherein:
the control unit is configured to determine the estimated time until automatic de-rate based on drive system parameters of a drive system of the vehicle.

8. The system of claim 1, wherein:
the performance parameter is at least one of engine acceleration rate, traction horsepower, or vehicle speed.

9. A method for controlling an engine of a vehicle, the method comprising the steps of:
estimating at least one automatic de-rate characteristic;
issuing a pre-emptive warning to an operator of the vehicle of the at least one automatic de-rate characteristic; and
modifying a performance parameter of the vehicle to avoid automatic de-rate.

10. The method according to claim 9, wherein:
the at least one automatic de-rate characteristic is a time until automatic de-rate.

11. The method according to claim 10, wherein:
the at least one automatic de-rate characteristic is a location of the vehicle in a haul cycle at the time of automatic de-rate.

12. The method according to claim 9, wherein:
the step of modifying the performance parameter of the vehicle includes at least one of limiting an engine acceleration rate, limiting fraction horsepower, or limiting a speed of the vehicle.

13. The method according to claim 9, wherein:
the step of modifying the performance parameter of the vehicle includes utilizing variable engine acceleration rate, traction horsepower, and speed limits based on a position of the vehicle in a haul route and at least one learned parameter.

14. The method according to claim 13, wherein:
the at least one learned parameter is a speed of the vehicle in a previous haul cycle.

15. The method according to claim 9, further comprising the step of:
issuing a secondary warning to the operator indicating the modified performance parameter.

16. The method according to claim 9, wherein:
the step of estimating the at least one automatic de-rate characteristic includes receiving a signal indicative of a current engine operation, comparing the signal to an allowable range of engine operation, and predicting a future engine performance based on the comparison.

17. The method according to claim 16, wherein:
the signal is indicative of a $NO_x$ emissions level.

18. The method according to claim 9, further comprising the step of:
receiving data relating to a geographic location of the vehicle;
wherein the step of modifying the performance parameter of the vehicle to avoid automatic de-rate is based on the data relating to the geographic location.

19. A system for a vehicle, comprising:
a sensor configured to monitor an engine operating condition of an engine of the vehicle; and
a control unit configured to communicate with the sensor;
wherein the control unit is configured to estimate a time until automatic de-rate of the engine and a location in a haul cycle where the de-rate will occur based on the engine operating condition; and
wherein the control unit is configured to modify a performance parameter of the vehicle in dependence upon the estimated time until, and location of, automatic de-rate.

20. The system of claim 19, wherein:
the sensor is a $NO_x$ sensor and the operating condition is a concentration of $NO_x$.

* * * * *